(12) United States Patent
Darr et al.

(10) Patent No.: US 9,145,816 B2
(45) Date of Patent: Sep. 29, 2015

(54) EXHAUST TREATMENT METHODS AND SYSTEMS

(75) Inventors: Rebecca J. Darr, Milford, MI (US);
Paul Jasinkiewicz, Northville, MI (US);
Matthew King, Arden, NC (US)

(73) Assignee: GM Global Technology Operations LLC, Detroit, MI (US)

( * ) Notice: Subject to any disclaimer, the term of this patent is extended or adjusted under 35 U.S.C. 154(b) by 294 days.

(21) Appl. No.: 13/471,672

(22) Filed: May 15, 2012

(65) Prior Publication Data

US 2012/0291421 A1 Nov. 22, 2012

Related U.S. Application Data

(60) Provisional application No. 61/487,066, filed on May 17, 2011.

(51) Int. Cl.
*F01N 3/00* (2006.01)
*F01N 11/00* (2006.01)
*F01N 3/20* (2006.01)
*F01N 9/00* (2006.01)

(52) U.S. Cl.
CPC .............. *F01N 11/00* (2013.01); *F01N 3/208* (2013.01); *F01N 9/007* (2013.01); *F01N 2550/05* (2013.01); *F01N 2610/02* (2013.01); *F01N 2900/102* (2013.01); *F01N 2900/1622* (2013.01); *F01N 2900/1806* (2013.01); *Y02T 10/24* (2013.01); *Y02T 10/47* (2013.01)

(58) Field of Classification Search
USPC ........................................ 60/284, 286
See application file for complete search history.

(56) References Cited

U.S. PATENT DOCUMENTS

| | | | | |
|---|---|---|---|---|
| 3,967,097 | A * | 6/1976 | Moretti ........................ | 701/123 |
| 6,363,771 | B1 * | 4/2002 | Liang et al. .................. | 73/23.31 |
| 2009/0266058 | A1* | 10/2009 | Kesse et al. ...................... | 60/295 |
| 2010/0089037 | A1* | 4/2010 | Bogema et al. ................. | 60/286 |
| 2010/0229541 | A1* | 9/2010 | Nandyala et al. ............... | 60/299 |

OTHER PUBLICATIONS

Nadel, Ben. Creating a Running Average without Storing Individual Values. Posted Jul. 3, 2009 to a blog (www.bennadel.com/blog).*

* cited by examiner

*Primary Examiner* — Thomas Denion
*Assistant Examiner* — Mickey France
(74) *Attorney, Agent, or Firm* — Cantor Colburn LLP

(57) ABSTRACT

A control method for an exhaust treatment system is provided. The method includes: selectively determining a fluid state from a plurality of fluid states based on a temperature of a fluid supply source; estimating an average consumption rate based on the fluid state; and evaluating a fluid supply within the fluid supply source based on the average consumption rate.

8 Claims, 3 Drawing Sheets

EXHAUST TREATMENT METHODS AND SYSTEMS

CROSS-REFERENCES TO RELATED APPLICATIONS

This patent application claims priority to U.S. patent application Ser. No. 61/487,066 filed May 17, 2011 which is hereby incorporated herein by reference in its entirety.

FIELD OF THE INVENTION

Exemplary embodiments of the present disclosure relate to control methods and systems for exhaust systems, and more particularly to control methods and systems for monitoring diesel emission fluid of an exhaust system.

BACKGROUND OF THE INVENTION

Exhaust gas emitted from an internal combustion engine, for example, a diesel engine, is a heterogeneous mixture that contains gaseous emissions such as carbon monoxide (CO), unburned hydrocarbons (HC) and oxides of nitrogen (NOx) as well as condensed phase materials (liquids and solids) that constitute particulate matter. Catalyst compositions typically disposed on catalyst supports or substrates are provided in an engine exhaust system to convert certain, or all of these exhaust constituents into non-regulated exhaust gas components.

In some cases, one or more selective catalytic reduction (SCR) devices are provided to reduce the amount of NOx in the exhaust. The SCR devices make use of ammonia ($NH_3$) or other reductant to reduce the NOx. For example, when the proper amount of $NH_3$ is available at the SCR device under the proper conditions, the $NH_3$ reacts with the NOx in the presence of an SCR catalyst to reduce the NOx emissions to, for example, nitrogen. Reductant storage systems can be provided to supply any needed reductant to the SCR.

Accordingly, it is desirable to provide systems and methods for monitoring the amount of reductant that is available at the SCR device to reduce NOx.

SUMMARY

In one exemplary embodiment, a control method for an exhaust treatment system is provided. The method includes: selectively determining a fluid state from a plurality of fluid states based on a temperature of a fluid supply source; estimating an average consumption rate based on the fluid state and the amount injected by the control system; and evaluating a fluid supply within the fluid supply source based on the average consumption rate.

The above features and advantages and other features and advantages of the invention are readily apparent from the following detailed description of carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
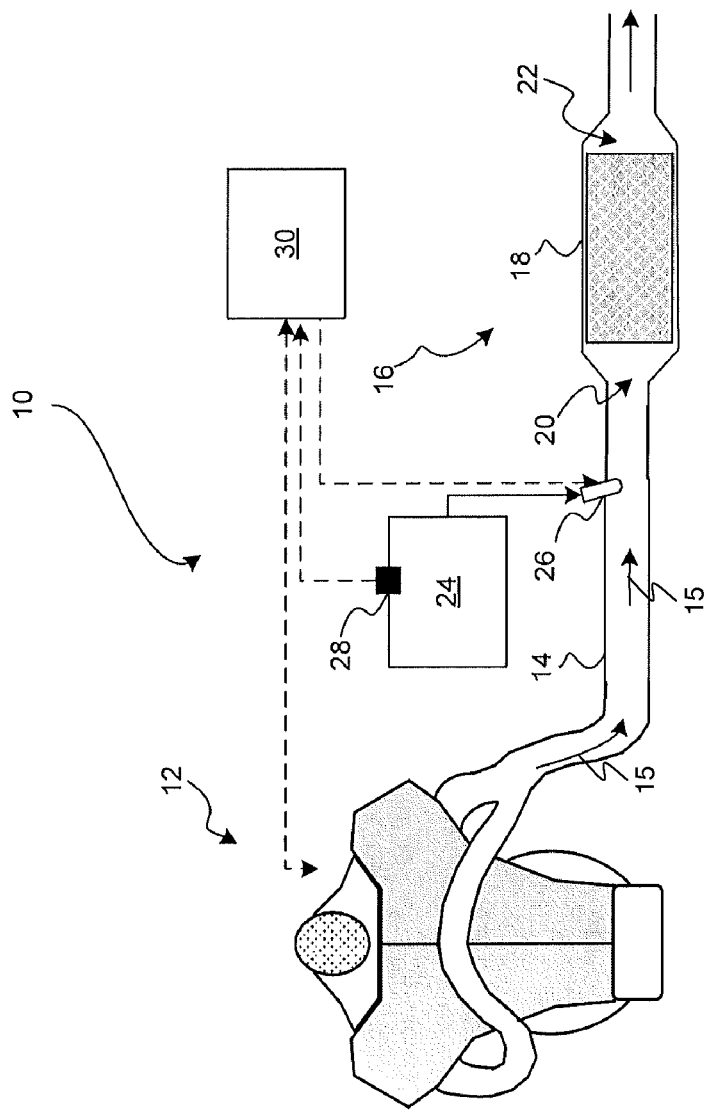
FIG. 1 is a schematic illustration of an exhaust system in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to an exhaust treatment system 10 for the reduction of regulated exhaust gas constituents of an internal combustion (IC) engine 12. As can be appreciated, the exhaust treatment system 10 described herein can be implemented in various engine systems. Such engine systems may include, for example, but are not limited to, diesel engines, gasoline engines, and homogeneous charge compression ignition engine systems.

As shown in FIG. 1, the exhaust treatment system 10 generally includes one or more exhaust gas conduits 14, and one or more exhaust treatment devices 16. The exhaust treatment devices 16 can include, for example, but are not limited to, an oxidation catalyst device (OC), a selective catalytic reduction device (SCR), a particulate filter (PF) or other exhaust treatment device. As can be appreciated, the exhaust treatment system 10 of the present disclosure may include various combinations of one or more of the exhaust treatment devices 16 and is not limited to the present example.

In the example of FIG. 1, the exhaust gas conduit 14, which may comprise several segments, transports exhaust gas 15 from the engine 12 to an SCR 18 of the exhaust treatment system 10. The SCR 18 may be disposed downstream of the engine 12. The SCR operates to reduce the oxides of nitrogen ($NO_x$) in the exhaust gas. In various embodiments, the SCR 18 may be constructed with a flow-through ceramic or metal monolith substrate that is wrapped in a support mat that expands when heated to secure and insulate the substrate which is packaged in a rigid shell or canister having an inlet 20 and an outlet 22 in fluid communication with the exhaust gas conduit 14. The substrate may include a $NO_x$ reducing catalyst composition such as an SCR catalyst composition applied thereto. The SCR catalyst composition may include a zeolite and one or more base metal components such as iron (Fe), cobalt (Co), copper (Cu) or vanadium (V) that can operate efficiently to convert $NO_x$ constituents in the exhaust gas in the presence of a reductant such as ammonia ($NH_3$).

The reductant may be supplied from a reductant supply source 24 and may be injected into the exhaust gas conduit 14 at a location upstream of the SCR 18 using an injector 26, or other suitable method of delivery of the reductant to the exhaust gas. The reductant may be in the form of a gas, a liquid, or an aqueous urea solution and may be mixed with air in the injector 26 to aid in the dispersion of the injected spray. A mixer or turbulator (not shown) may also be disposed within the exhaust conduit 14 in close proximity to the injector 26 to further assist in thorough mixing of the reductant with the exhaust gas.

A control module 30 may control the engine 12 and one or more components of the exhaust treatment system 10 based on sensed and/or modeled data and further based on the exhaust system fluid monitoring systems and methods of the present disclosure.

Generally speaking, the exhaust system fluid monitoring systems and methods monitor a temperature of the supply source 24 (e.g., ambient temperature within, or outside of the supply source 24 that may be sensed by one or more temperature sensors 28) to determine a fluid state. Based on the fluid state, the exhaust system fluid monitoring systems: estimate a mass of reductant in the tank; estimate a consumption rate of the reductant; and determine a distance remaining using the estimated mass and consumption rate. The distance remaining value is then used to trigger a vehicle speed inducement strategy for low levels of reductant. Further based on the fluid state, the exhaust system fluid monitoring systems selectively control the dosing of the reductant. For example, the exhaust system fluid monitoring systems control the dosing of the reductant at reduced levels when in a frozen state to prevent cavity formation in the supply source which can occur if reductant is injected at a rate higher than the rate at which the fluid is thawing in the supply source.

For example, if the temperature is greater than a threshold, then the fluid state is in a thawed state, and when the temperature is less than a threshold, the fluid state is in a frozen state. When the fluid state is in the thawed state, the fluid monitoring systems and methods: estimate an amount of fluid in the tank using a first mass estimation method; estimate a consumption rate of the fluid using a first consumption rate estimation method; and determine a distance remaining using the estimated mass and consumption rate.

When the fluid state is the frozen state, the fluid monitoring systems and methods: estimate an amount of fluid in the tank using a second mass estimation method; estimate the consumption rate using a second consumption rate estimation method (the mass estimation method when in a frozen state is actually the same as when in a thawed state—the only difference being the initial history is reset to a specified value); and determine a distance remaining using the estimated mass and consumption rate.

Figure 2:
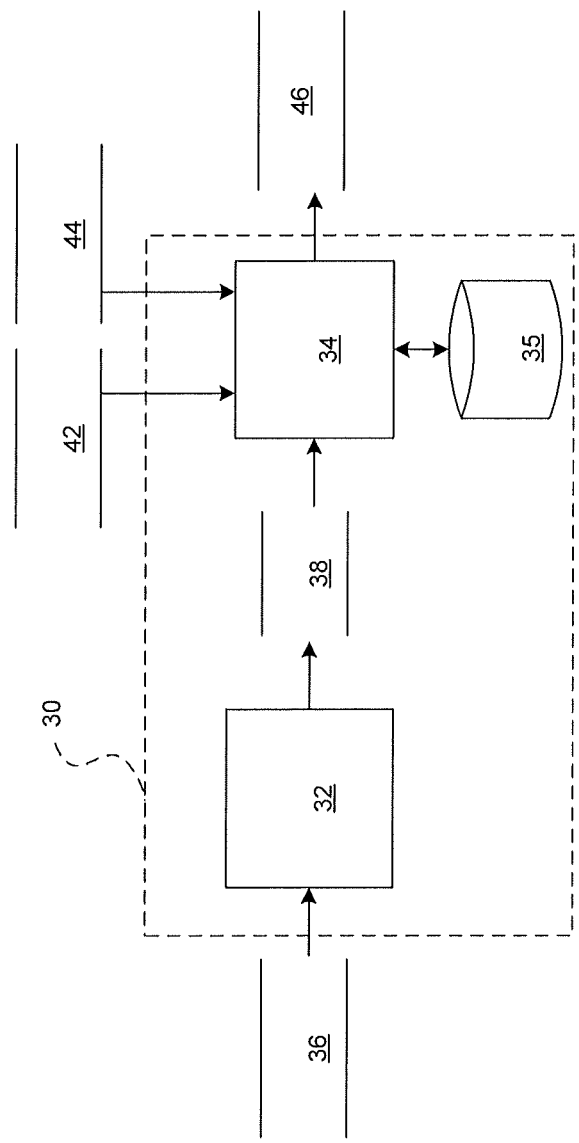
FIG. 2 is a dataflow diagram illustrating an exhaust system control system in accordance with an exemplary embodiment.

Referring now to FIG. 2, a dataflow diagram illustrates various embodiments of a consumption rate estimation system of the exhaust system fluid monitoring system that may be embedded within the control module 30. Various embodiments of consumption rate estimation systems according to the present disclosure may include any number of sub-modules embedded within the control module 30. As can be appreciated, the sub-modules shown in FIG. 2 may be combined and/or further partitioned to similarly estimate the consumption rate for use in the determination of the distance remaining calculation. Inputs to the control module 30 may be sensed from the engine 12 (FIG. 1), received from other control modules (not shown), and/or determined/modeled by other sub-modules (not shown) within the control module 30. In various embodiments, the control module 30 includes a state determination module 32, a consumption rate determination module 34, and a history datastore 35.

The state determination module 32 receives as input tank temperature 36. Based on the tank temperature 36, the state determination module 32 determines a fluid state 38. In various embodiments, the fluid state 38 can be at least one of a thawed state (e.g., when the tank temperature is greater than a predetermined threshold), and a frozen state (e.g., when the tank temperature is less than a predetermined threshold).

The consumption rate determination module 34 receives as input the fluid state 38, a distance driven 42, and a dosing quantity 44. Based on the fluid state 38, the consumption rate determination module 34 tracks the dosing quantity 44 and the distance driven 42 to determine a history of the consumption rate. In various embodiments, when the fluid state 38 is the thawed state, the consumption rate determination module computes and stores the history in the history datastore 35, by for example, computing the past X consumption rates over an interval distance (e.g., where X is equal to 5 or any other number).

In various embodiments, when the fluid state 38 is the frozen state, the consumption rate determination module 34 resets the history (e.g., the X consumption rates) to one or more predetermined values.

Based on the consumption history, the consumption rate determination module 34 determines an average consumption rate 46. In various embodiments, the consumption rate determination module 34 can compute the average consumption rate 46 ($CR_{AVE}$) using the following equation:

$$CR_{AVE}=(rCurr)*(facWghNew)+rAct1+rAct2+rAct3+rAct4+(rAct5)*(facWghOld).$$

Where rCurr represents the currently calculating consumption rate; rAct1 through rAct5 represent the consumption rate history (e.g., rAct5 being the oldest). The facWghNew represents the weight of consumption from the current interval (e.g., between 0 and 1); and facWghOld represent the weight of consumption from the oldest interval (e.g., from 1 to 0).

The average consumption rate 46 can then be used by the exhaust system fluid monitoring system to determine the distance remaining and perform further control actions.

Figure 3:
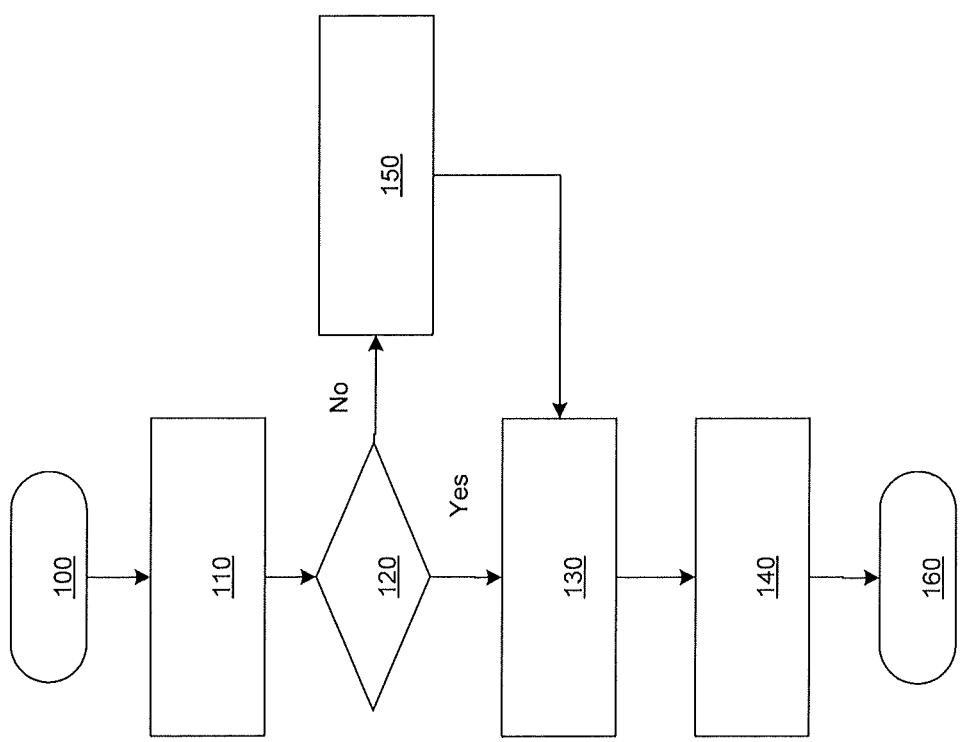
FIG. 3 is a flowchart illustrating an exhaust system control method in accordance with an exemplary embodiment.

Referring now to FIG. 3, and with continued reference to FIGS. 1 and 2, a flowchart illustrates consumption rate estimation method that can be performed by the control module 30 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or run continually during operation of the engine 12.

In one example, the method may begin at 100. The fluid state 38 is determined at 110. If the fluid state 38 is the thawed state at 120, the average consumption rate 46 is determined based on consumption history at 130. The average consumption rate 46 is stored in the consumption history at 140 and the method may end at 160.

If, however, the fluid state 38 has just entered the frozen state at 120, the consumption history is reset to a predetermined value at 150 and the average consumption rate 46 is determined based on the consumption history at 130. The average consumption rate 46 is stored in the consumption history at 140 and the method may end at 160.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed but that the invention will include all embodiments falling within the scope of the present application.

What is claimed is:

1. A control method for an exhaust treatment system included in a vehicle, comprising:
   measuring a distance driven by the vehicle using a first electronic sensor and measuring a fluid dosing quantity of fluid injected by the exhaust treatment system using a second electronic sensor;
   generating a history of fluid consumption rate that stores a plurality of fluid consumption rates by computing each of the fluid consumption rates based on the distance driven for the vehicle and the fluid dosing quantity;
   selectively determining whether the fluid exists in a first fluid state or a second fluid state from a plurality of fluid states based on a temperature of the fluid supply source;
   in response to determining that the fluid state is a first state, modifying, by a control module comprising an electronic computer processor coupled to electronic memory, the history of fluid consumption rate by setting one or more of the plurality of fluid consumption rates already stored in the history of fluid consumption rate to one or more predetermined values;
   after modifying the history of fluid consumption rate, estimating an average fluid consumption rate based on the history of fluid consumption rate;
   in response to determining that the fluid state is the second state, estimating an average fluid consumption rate based on a non-modified history of fluid consumption rate;
   evaluating the fluid within the fluid supply source based on the average fluid consumption rate estimated after the history of fluid consumption rate is modified; and
   selectively initiating a vehicle speed inducement strategy based on a distance remaining for the vehicle.

2. The method of claim 1 wherein the plurality of fluid states includes a thawed state and a frozen state.

3. The method of claim 1 wherein the first state is at least one of frozen state, and the second fluid state is a thawed state.

4. The method of claim 1 further comprising determining the distance remaining for the vehicle based on the average fluid consumption rate estimated after the history of fluid consumption rate is modified.

5. An exhaust treatment system included in a vehicle, the exhaust system comprising:
   a fluid supply source that supplies fluid to the exhaust treatment system;
   a first electronic sensor configured to measure a distance driven by the vehicle, a second electronic sensor configured to measuring a dosing quantity of the fluid supplied to the exhaust system, and a third sensor configured to measure a temperature of the fluid stored by the fluid supply source;
   a control module comprising a computer processor coupled to a memory that stores computer readable instructions, the computer process, when executing the computer readable instructions, configured to:
      generate a history of fluid consumption rate that stores a plurality of fluid consumption rates by computing each of the fluid consumption rates based on the distance driven for the vehicle and the fluid dosing quantity;
      selectively determine whether the fluid exists in a first fluid state or a second fluid state from a plurality of fluid states based on a temperature of the fluid stored in the fluid supply source;
      in response to determining that the fluid state is the first state, modify the history of fluid consumption rate by setting one or more of the plurality of fluid consumption rates already stored in the history of fluid consumption rate to one or more predetermined values;
      after modifying the history of fluid consumption rate, estimate an average fluid consumption rate based on the history of fluid consumption rate;
      in response to determining that the fluid state is the second state, estimate an average fluid consumption rate based on a non-modified history of fluid consumption rate;
      evaluate a fluid supply within the fluid supply source based on the average fluid consumption rate estimated after the history of fluid consumption rate is modified,
      wherein the control module selectively initiates a vehicle speed inducement strategy based on a distance remaining for the vehicle.

6. The system of claim 5 wherein the plurality of fluid states includes a thawed state and a frozen state.

7. The system of claim 5 wherein the first state is a frozen state and the second state is a thawed state.

8. The system of claim 5 wherein the control module determines the distance remaining for the vehicle based on the average fluid consumption rate estimated after the history of fluid consumption rate is modified.

* * * * *